Aug. 28, 1962
R. E. HALVERSON
3,051,060
DEVICE FOR SUPPORTING AND MOVING AN ARTICLE IN A MACHINE
Filed Nov. 25, 1959
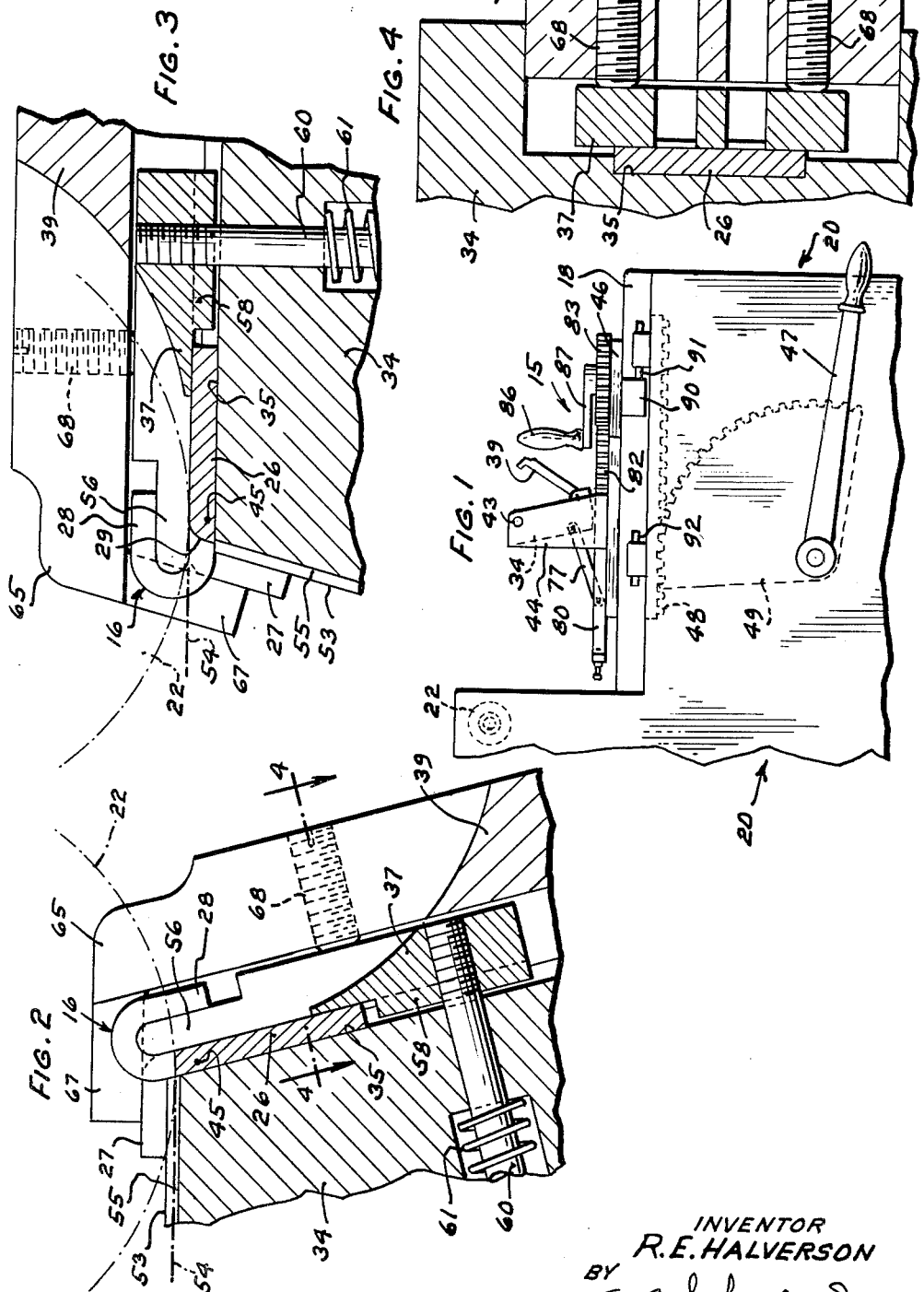
INVENTOR
R.E. HALVERSON
BY
A.C. Schwarz, Jr.
ATTORNEY

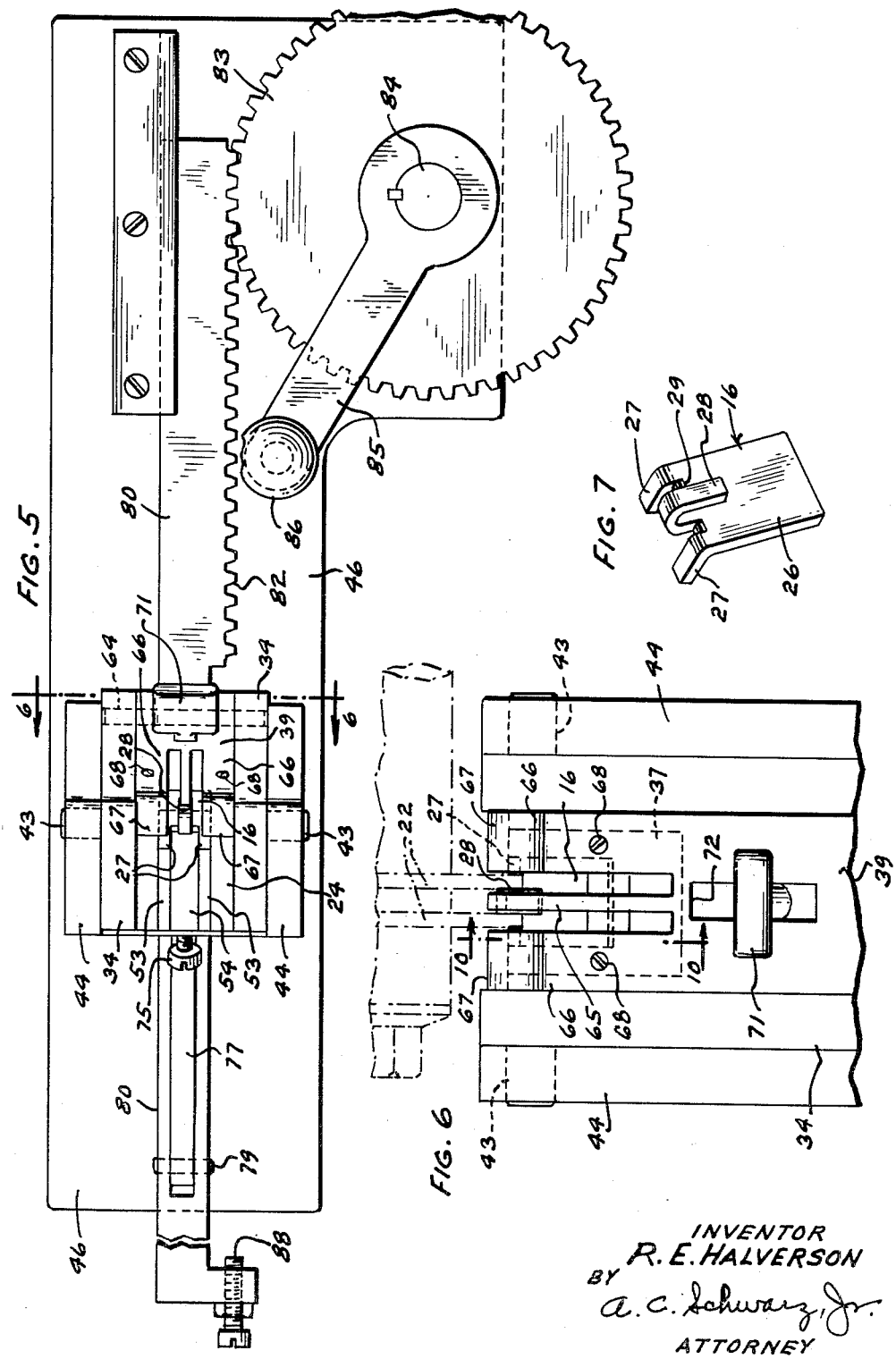

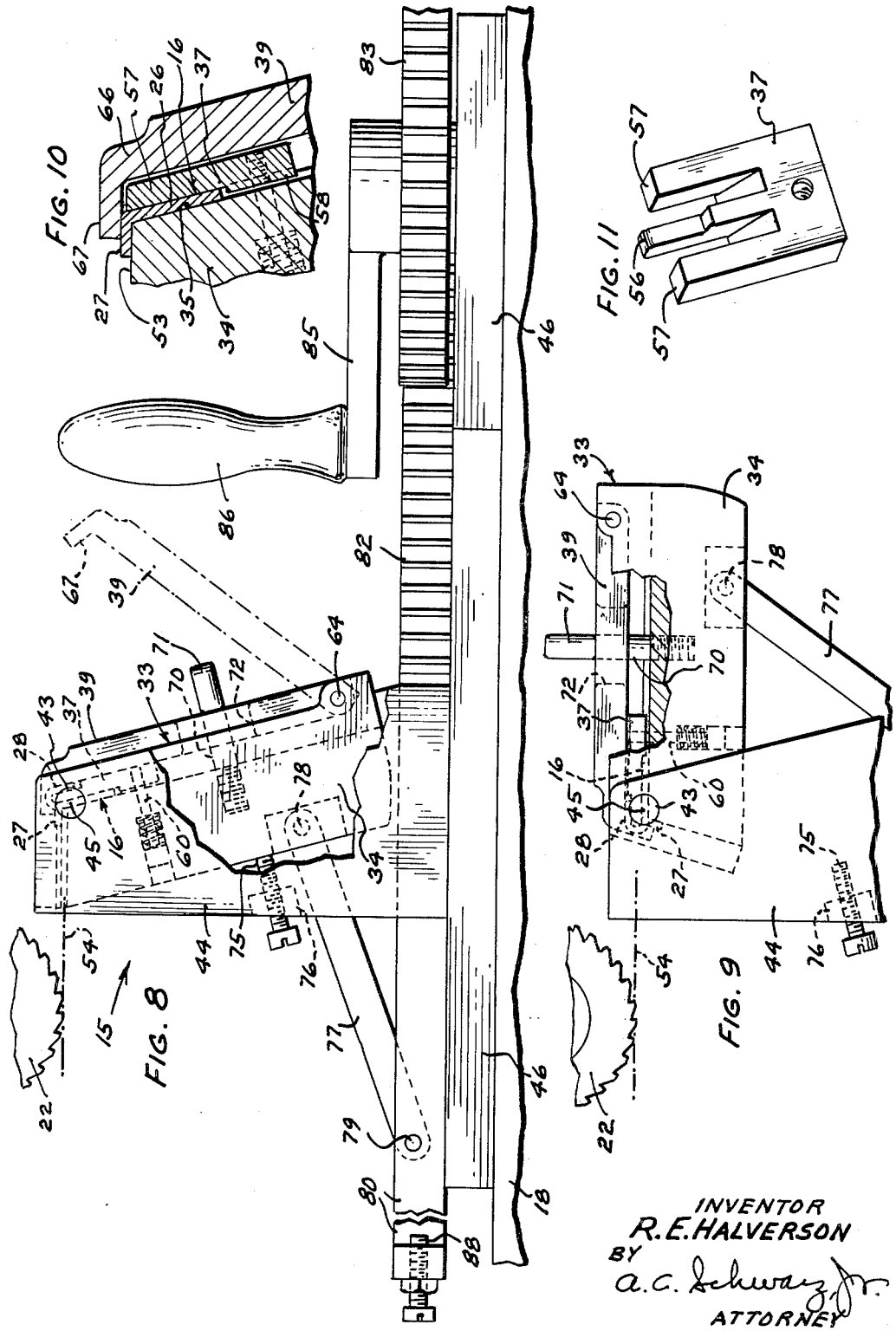

# United States Patent Office 3,051,060
Patented Aug. 28, 1962

3,051,060
DEVICE FOR SUPPORTING AND MOVING AN ARTICLE IN A MACHINE
Richard E. Halverson, Westchester, Ill., assignor to Western Electric Company, Incorporated, New York, N.Y., a corporation of New York
Filed Nov. 25, 1959, Ser. No. 855,460
2 Claims. (Cl. 90—18)

This invention relates to a device for supporting and moving an article in a machine, and more particularly to a fixture for supporting an article in one position in a milling machine for movement into engagement with a cutter to cut one portion of the article and for swinging the article to a second position to cut another portion of the article and a round surface thereon.

An object of the present invention is to provide an improved device for supporting and moving an article in a machine.

Another object of the invention is to provide a fixture for supporting an article in a machine in one position for movement into engagement with a cutter to cut one portion of the article and for turning the article to a second position to cut another portion thereof and a round surface thereon.

With these and other objects in view, the present invention contemplates mounting a fixture on the table of a milling machine, the fixture having a pivoted holder capable of supporting an article in a first position for horizontal movement with the table to a cutting station with the article in engagement with a rotary cutter to effect the cutting of one portion of the article and having mechanism for turning the holder and the article to a second position to effect the cutting of another portion of the article and a curved surface thereon.

Other objects and advantages of the invention will become apparent by reference to the following detailed description thereof and the accompanying drawings in which:

FIG. 1 is a fragmentary elevational view of a milling machine and an article holding and turning fixture thereon embodying the present invention;

FIG. 2 is a fragmentary enlarged vertical sectional view of the article holder of said fixture in one position;

FIG. 3 is a view similar to FIG. 2 showing the article holder in a second position;

FIG. 4 is a fragmentary sectional view through the article holder taken on the line 4—4 of FIG. 2;

FIG. 5 is a plan view of the fixture;

FIG. 6 is a fragmentary elevational cross-sectional view of the fixture indicated by the line 6—6 on FIG. 5;

FIG. 7 is a perspective view of an article to be supported in the present fixture;

FIG. 8 is a fragmentary side elevational view of the fixture with parts broken away and showing the article holder in one position;

FIG. 9 is a fragmentary elevational view of the fixture showing the article holder in a second position;

FIG. 10 is a fragmentary vertical sectional view of the work holder taken on line 10—10 of FIG. 6; and FIG. 11 is a perspective view of an element of the work holder.

Referring to the drawings, the present fixture 15 is designed to hold an article 16 (FIG. 7) in a normal first position on the table 18 (FIG. 1) of a milling machine 20 for movement by the table 18 to a predetermined cutting station in engagement with a pair of milling cutters 22 to effect the cutting of one portion of the article, and for pivoting the article to a second position to effect the cutting of another portion of the article and a round surface thereon. The article 16 is a soft iron relay armature having a flat substantially rectangular body 26, a pair of spaced fingers 27 bent laterally of the body 26 to one side thereof and a centrally disposed finger 28 spaced from the fingers 27 and reversely bent on the other side of the body into the shape of a hook.

In the milling operation the milling cutters 22 are adapted to cut the inwardly directed opposing edge portions of the fingers 27 and the outwardly directed opposed edge portions of the middle finger 28 and to cut curved surfaces 29 on the body 26 at the ends of the slots between the fingers 27 and 28.

The article 16 is adapted to be supported in a holder 33 of the fixture 15 which holder comprises a block 34 having a positioning groove 35 for receiving the body 26 of the article therein, a spacer element 37 floatingly mounted on the block 34 for supporting the article 16 on the block in a predetermined position, and a clamping plate 39 hingedly mounted on the block 34 for clamping the article 16 to the block 34. A pair of trunnions 43 on the upper portion of the block 34 are rotatable in apertures in a pair of upright frame plates 44 for supporting the holder 33 for movement about an axis 45 parallel to the axis of the cutters 22 from a normal first inclined position shown in FIG. 8 to a second, horizontal position as shown in FIG. 9. The vertical frame plates 44 extend upwardly from a horizontal base plate 46 of the fixture which is suitably secured to the table 18.

Horizontal movement is imparted to the table 18 by actuation of a lever 47 which is operatively connected to the table by means of a rack 48 and a gear sector 49.

At its upper end the block 34 of the article holder 33 is provided with surfaces 53 (FIGS. 2 and 10) for supporting the fingers 27 of the article 16 in a horizontal position above the cutting level 54 of the milling cutters 22 when the holder is in its normal inclined position. A groove 55 in the upper end of the block 34 provides clearance for movement of the cutters 22 into engagement with the article 16. Vertical clearance grooves for the milling cutters 22 are also formed in the spacer element 37 and in the clamping plate 39 in alignment with the spaces between the bases of the fingers 28 and 27.

The clearance slots in the spacer element 37 divide the upper portion thereof into three fingers, the middle one 56 of which is shaped to fit between the body 26 and the finger 28 of the article 16, and fingers 57 of which overlie portions of the body 26 of the article 16. A rectangular boss 58 (FIG. 2) projecting from one face of the spacer element 37 fits in the positioning groove 35 of the block 34 and serves to prevent lateral displacement of the spacer element. A headed screw 60 threadedly secured to the spacing element 37 and slidably mounted in a counterbore in the block 34 cooperates with a spring 61 for moving the spacing element 37 toward the block to yieldably maintain the body 26 of the article firmly against the block 34 of the holder 33.

At its lower end the clamping plate 37 is pivotally mounted on a hinged pin 64 on the block 34 and at its upper end of the clamping plate has a straight middle finger 65 and a pair of side fingers 66 which latter fingers are provided with laterally extending portions 67 adapted to overlie the fingers 27 of the article 16 and press them against the supporting surfaces 53 of the block 34. The straight middle finger 65 of the clamping plate 39 is adapted to overlie and support the reversely bent middle finger 28 of the article 16 during the cutting operation.

A pair of screws 68 threaddedly mounted in the side fingers 66 of the clamping plate 39 project slightly beyond the inner face of the clamping plate and engage the spacing element 37 to apply pressure thereto for clamping the article 16 to the block 34. A clamping screw 70 (FIG. 1) threaddedly mounted in the block 34 has a cross-head 71 thereon adapted to pass through an elongated slot 72 in the clamping plate 39 and to be turned 90° to urge the clamping plate in a clockwise position as viewed in FIG. 8 to effect the clamping of the article 16 in the holder 33.

In its normal inclined position the holder 33 rests against a stop screw 75 (FIG. 8) mounted in a crossbar 76 extending between the upright frame plates 44. One end of a link 77 is pivotally connected at 78 to the block 34 of the holder and the other end of the link 77 is pivotally connected at 79 to a rod 80 slidably mounted on the horizontal base plate 46. A rack 82 formed on one end of the bar 80 meshes with a gear 83 fixed to a vertical shaft 84 rotatably supported on the base plate 46. A crank arm 85 is secured to the shaft 84 and has a handle 86 by means of which the gear 83 may be rotated to effect the reciprocation of the rod 80 and the movement of the holder 33 to and from its normal inclined position (FIG. 8) and its horizontal position (FIG. 9).

Movement of the rod 80 in one direction is arrested by engagement of a stop 88 (FIG. 8) on one end of the rod with an inwardly directed flange portion of a side wall 44, and movement of the rod 80 in the opposite direction is arrested by the engagement of the block 34 with the stop screw 75. The table 18 is also provided with a laterally projecting lug 90 (FIG. 1) which cooperates with a stop 91 on the machine 20 for limiting its movement in one direction away from the cutters 22 and cooperates with a stop 92 on the machine to arrest its forward movement and stop the holder 33 in a predetermined position with the axis 45 of pivotal movement of the holder 33 in vertical alignment with the axis of the cutters 22 (FIG. 2).

In the operation of the device an article 16 to be finished is placed on the holder 33 with the body 26 of the article inserted between the spacer element 37 and the block 34 and in the groove 35 of the block in the position indicated in FIG. 2 after which the pressure plate 39 is moved to closed position and the head 71 of the clamping screw 70 turned to effect the clamping of the article 16 in the holder 33. The operator then advances the table 18 by means of the lever 47 to move the article 16 horizontally into engagement with the cutters 22 and to stop the article 16 in the position shown in FIG. 2 to effect the cutting of the inner edge portions of the fingers 27 of the article 16 and outer edges of the upper curved portion of the middle finger 28 and the upper portion of the body 26 between the middle finger 28 and the fingers 27.

The operator then rotates the crank 85 to effect the movement of the holder 33 from its inclined position (FIG. 8) to its horizontal position (FIG. 9) to turn the article 16 about the axis 45 to effect the cutting of the opposite edges of the remaining portion of the center finger 28 of the article 16 and to cut the round surfaces 29 thereon. The table 18 is then returned to withdraw the article 16 from the cutters 22 after which the article is removed from the holder 33. The part 16 is supported by the holder in a predetermined position relative to the axis 45 of rotation of the holder 33 so that the curved surface 29 cut thereon has a radius of curvature which is tangent to one face of the body 26 of the article 16.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A fixture for use in a milling machine for supporting an article for rectilinear and arcuate movements relative to a rotary cutter, said fixture comprising a base releasably attachable to the table of the milling machine for rectilinear movement therewith relative to the cutter, a holder for releasably supporting the article, means on said base for supporting said holder for movement therewith and for pivotal movement thereon from a normal first position to a second position about an axis parallel to the axis of the rotary cutter, and means on said base for moving said holder from said first position to said second position.

2. A fixture for use in a milling machine for supporting an article for rectilinear and arcuate movements relative to a rotary cutter, said fixture comprising a base releasably attachable to the table of the milling machine for rectilinear movement therewith relative to the cutter, a pair of spaced upright members on said base, a block disposed between said upright members and having a seat for positioning and supporting the article thereon, means on said block for clamping the article thereto, means for mounting said block on said upright members for pivotal movement from a normal first position to a second position about an axis passing through the article parallel to the axis of the rotary cutter, a rod slidably mounted on said base for horizontal movement, a link pivotally connected to said rod and to said block for moving said block from said first position to said second position in response to actuation of said rod from a predetermined retracted position to a predetermined forward position, and manually operable means on said base for actuating said rod from said retracted position to said forward position while the article is in engagement with the cutter.

References Cited in the file of this patent

UNITED STATES PATENTS

| 731,686 | Johnson | June 23, 1903 |
| 2,652,243 | Reed | Sept. 15, 1953 |
| 2,695,015 | Cooper | Nov. 23, 1954 |

FOREIGN PATENTS

| 834,317 | Germany | Mar. 17, 1952 |

OTHER REFERENCES

Yates: German application Serial No. Y38Ib/87a printed April 12, 1956 (K87a22).